United States Patent [19]

Seyferth et al.

[11] 4,397,828

[45] Aug. 9, 1983

[54] STABLE LIQUID POLYMERIC PRECURSOR TO SILICON NITRIDE AND PROCESS

[75] Inventors: Dietmar Seyferth, Lexington; Christian C. Prud'Homme, Boston; Gary H. Wiseman, Somerville, all of Mass.

[73] Assignee: Massachusetts Institute of Technology, Cambridge, Mass.

[21] Appl. No.: 321,494

[22] Filed: Nov. 16, 1981

[51] Int. Cl.³ .................... C01B 21/68; C01B 33/06; C01B 33/00
[52] U.S. Cl. ................................. 423/344; 423/324; 501/97
[58] Field of Search .................. 423/324, 344; 501/97

[56] References Cited

U.S. PATENT DOCUMENTS 3,959,446 5/1976 Mazdiyasni et al. ............... 423/344
4,122,220 10/1978 Sussmuth .............................. 423/344

FOREIGN PATENT DOCUMENTS 54-134098 10/1979 Japan .................................. 423/344
7103523 9/1971 Netherlands ........................ 423/344

OTHER PUBLICATIONS

Glemser et al., Uberdenthernischen Abbau von Siliciumdiimid Si(NH)$_2$ Z, Anorg, Allge. Chem., Jan. 1959, pp. 134-141.
Kato et al., Finely Divided Silicon Nitride from Vapor Phase Reaction Between Silicion Tetrachloride and Ammonia, Yogyo-Kyokai-Shi, 80 (3), pp. 28-34, 1972.
Mazdiyasni et al., Synthesis, Characterization and Consolidation of Si$_3$NY Obtained from the Ammonolysis of SiCl$_4$, J. Amer. Ceramic, Soc. 56 12, pp. 628-633, 1973.
Gill et al., Self Bonded Silicon Nitride, The Refractory Journal, Mar. 1962, pp. 92-95.

Primary Examiner—Gary P. Straub
Attorney, Agent, or Firm—Arthur A. Smith, Jr.; Paul J. Cook

[57] ABSTRACT

Stable, viscous polymers of silicon, nitrogen and hydrogen are formed by reacting a halosilane with ammonia in the presence of a solvent comprising an aliphatic ether, a chloromethane or mixtures thereof. After the solvent has been removed from the reaction product, the polymer can be poured into a container of desired shape and then can be sintered to form a uniform silicon nitride product.

6 Claims, No Drawings

STABLE LIQUID POLYMERIC PRECURSOR TO SILICON NITRIDE AND PROCESS

BACKGROUND OF THE INVENTION

The U.S. Government and its agencies have a paid up license in this invention as provided by the terms of Grant No. N00014-76-C-0837, Task NR053-618, from the Office of Naval Research and IPA-0010.

The present invention relates to stable liquid polymers of silicon, nitrogen and hydrogen solidified articles produced therefrom, processes for making the same and processes for producing particulate silicon nitride therefrom.

Prior to the present invention, polymers of silicon, nitrogen and hydrogen have been produced which are unstable viscous liquids in that they harden to a solidified product approximately within 1 day under room temperature after the solvent from which they are prepared has been removed, Stock et al, Berichte, vol. 54, p. 740 (1921).

Presently, silicon nitride is prepared directly from the elements at high temperature or by vapor phase reactions of ammonia with chlorosilanes ($SiCl_4$, $HSiCl_3$, $H_2SiCl_2$). Shaped articles are produced from the resultant silicon nitride particles by mixing the particles with a polymeric binder and firing the resultant mixture to sinter the particles. In this process, it is difficult to form articles having a shape other than the most simple geometrical shapes since the compositions shrink upon sintering, thereby causing undesirable thermal stresses in the article being formed which inevitably leads to fracture.

It would be highly desirable to provide a means for forming shaped silicon nitride articles which can be readily shaped to any desired form and which can be sintered to a uniform solid article with a minimum thermal stress on the article so that fracture does not inherently result. Furthermore, it would be desirable to provide such a procedure whereby there is no possibility of contamination in the final product such as with silicon carbide or graphite.

SUMMARY OF THE INVENTION

The present invention provides novel stable liquid compositions comprising polymers of silicon, nitrogen and hydrogen which are formed initially as a solution dissolved in an organic solvent. The polymers are formed by reacting ammonia with a halosilane in an aliphatic ether or a chloromethane solvent under conditions which effect precipitation of ammonium halide, while leaving the polymer in solution. The liquid product obtained after removal of the solvent is highly stable in that it is pourable over long periods of time and can be formed to any desired shape by placing it in a suitable vessel. The liquid polymer can be heated to produce a silicon nitride ceramic shaped product.

DESCRIPTION OF SPECIFIC EMBODIMENTS

In accordance with this invention, relatively solvent-free polymers of silicon, hydrogen and nitrogen are formed in a two step procedure. In the first step, an halosilane is reacted with ammonia in accordance with the Equation 1:

$$SiX_2H_2 + 3NH_3 \rightarrow 2NH_4X + (\text{-}H_2SiNH\text{-})_n$$

In Equation 1, X can be fluorine, chlorine, bromine, or iodine. Representative suitable solvents include ethers such as diethyl ether, tetrahydrofuran, diisopropyl ether or other aliphatic ethers, a chloromethane solvent such as dichloromethane, chloroform or the like, or mixtures thereof. In contrast, it has been found that in aliphatic or aromatic hydrocarbon solvents such as hexane or benzene the reaction to form the soluble polymer product proceeds in only low yield. Accordingly, in this invention it is essential to utilize either the chlorinated methane or ether solvents, or mixtures thereof. This reaction is conducted at a temperature between about −78° C. and about 35° C., preferably between about 0° C. and about 25° C. in an oxygen free and moisture free inert atmosphere such as nitrogen, argon or the like. Generally, the reaction time depends on the gaseous ammonia flowrate, typically 2.0–2.5 ml/sec. An excess of ammonia must be used.

In a second step, the solvent is removed from the solution at reduced pressure (0.01 mm Hg) at room temperature to 50° C., and in any event, less than 100° C. in order to minimize or prevent gelation or solidification of the polymer. The liquid product obtained after the solvent removal is a viscous, somewhat cloudy liquid which is moisture-sensitive and is relatively stable in that it does not gel or solidify even after about 7 days when stored at 0° C. in a moisture free atmosphere. The product does gel slightly after it has been kept for 2 days at room temperature, to a greater extent on longer storage at room temperature. This contrasts with the prior art product produced when utilizing benzene as the solvent during reaction of the halosilane with ammonia which is farless stable. The product is capable of being poured and thus can be deposited into a container or a mold of a desired shape such that it can be subsequently converted to a silicon nitride sintered shaped article. The liquid compositions of this invention can be converted to a gel-like material by heating to a temperature between about 50° C. and about 150° C. which can be converted to a solid by further heating at a temperature between about 100° C. and about 200° C. These processes of conversion from liquid to gel and from gel to solid take place with only a very little weight loss. The resultant solid then can be pyrolyzed to form a sintered silicon nitride article by heating to a temperature of between about 500° C. and about 1200° C., preferably between about 1000° C. and about 1200° C. in an inert, moisture-free atmosphere. Accordingly, the present invention provides substantial advantages over the prior art processes for forming sintered silicon nitride materials in that the desired article can be preformed prior to the sintering step, thereby preventing excess voids in the final product. In addition, the liquid product of this invention can act as a binder for powdered silicon nitrides produced by conventional processes such as gas phase processes and the resultant mixture can be pyrolyzed to provide a uniform silicon nitride product.

In one aspect of this invention, the pyrolysis can be carried out in a stream of nitrogen at a temperature between about 1000° C. and about 1200° C. in order to convert any silicon present to silicon nitride.

The following examples illustrate the present invention and are not intended to limit the same.

All reactions in the examples were carried out under an argon atmosphere unless otherwise stated. All glassware was flame-dried under argon and the joints sealed with Teflon tape or Teflon sleeves (to prevent contamination by the usually used silicon stopcock grease). Anhydrous ammonia was dried further by passing it through a 2.5 foot column loosely packed with KOH pellets. Dichlorosilane, $H_2SiCl_2$, was quantified by condensing it into a graduated trap (cooled with dry ice/isopropanol), allowing the condensed liquid to warm nearly to room temperature, then measuring the condensate volume ($H_2SiCl_2$ density = 1.22 at 25° C. All solvents were rigorously dried. Pyrolysis reactions were carried out in a quartz tube equipped with vacuum stopcocks at each end. A one-foot Basic Products Tube Furnace equipped with a Wheelco 401 Temperature Controller and a high temperature thermocoupled was used to effect the pyrolysis. Samples were transferred to a fused silica boat and placed in the tube in a nitrogen-filled dry box. The appropriate blanket gas then was exchanged for the nitrogen once the tube had been taken out of the dry box by evacuating and filling the tube three times. X-ray powder patterns were obtained using a Philips X-ray diffractometer with Cu-K$\alpha$ radiation source and Ni filter ($\lambda = 1.5418A$). Diffraction angles were measured as $2\theta$ in degrees and are reported as $d_o$ in Å ($n\lambda/2d_o = \sin\theta$).

EXAMPLE I

Reaction of Dichlorosilane with Ammonia in Diethyl Ether

Into a one-liter, three-necked, round-bottomed flask equipped with a dry ice/isopropanol condenser, mechanical stirrer and a no-air rubber septum was cannulated 500 ml of dry, freshly distilled diethyl ether. $H_2SiCl_2$ (44.0 ml, 53.7 g, 0.531 mol) was volatilized and bubbled into the ether. The flask was placed in an ice bath. With stirring, ammonia (an excess, flow rate 2.0–2.5 ml per sec) was bubbled into the solution until the excess could be seen refluxing off of the condenser (typically 5–6 hr was required). During this time, a dense white precipitate formed in the flask (in the solution and above the solution). The reaction mixture was allowed to stand overnight without stirring. The flask and contents then were transferred to the dry box and the white solid was filtered using a 500 ml, medium porosity fritted funnel. The filtrate was clear and colorless. The precipitate was washed three times with 100 ml portions of $Et_2O$ and the washings were added to the filtrate. The solution was removed from the dry box and concentrated by trap-to-trap distillation, first at 250 mm Hg (room temp.) and finally at 0.1 mm Hg (heat gun) to remove the last traces of solvent. A cloudy, slightly viscous oil, I, (15.2 g, 0.340 mol of the "ideal" $(H_2SiNH)_n$, 64% yield) remained behind. The 250 MHz $^1H$ NMR spectrum of this oil (DCCl$_3$, HCCl$_3$ reference) showed two types of signals in the Si-H region, SiH$_A$, $\delta$4.70 (m, internal SiH$_2$ and/or SiH) and SiH$_B$, 4.35 ppm (s, terminal SiH$_3$), with an integrated ratio of SiH$_A$:SiH$_B$ = 5.9. A broad signal at $\delta$1.00–1.70 ppm was assigned to NH. The (SiH$_A$+SiH$_B$): NH ratio was 3.3. The infrared spectrum showed the following (cm$^{-1}$): 3390m ($\nu$NH), 2172vs ($\nu$SiH), 1180 ($\delta$NH), 1020–84br ($\nu$SiNSi, asym, sym, and $\delta$SiH), 720sh ($\delta$SiH$_3$ rock). I has the general structure $(H_2SiNH)_n$, with the added features of $H_3Si$ terminal groups and some cross-linking on the basis of its IR and NMR spectra. Careful GLC analysis (8' SE-30 silicone rubber gum on Chromosorb P, 70° C.) of I showed only one very small peak due to a volatile product (not isolated).

The White precipitate formed in the ammonolysis reaction was isolated and dried in a 100° C. oven for 24 hr. A total of 52.6 g (92% as pure $NH_4Cl$) was recovered. However, the solid did not dissolve completely in water and thus probably contained some cross-linked ether-insoluble Si-N polymer.

EXAMPLE II

Reaction of Dichlorosilane with Ammonia in Dichloromethane

A reaction was carried out using the procedure outlined above between 45.5 ml (55.5 g, 0.55 mol) of dichlorosilane and an excess of gaseous ammonia in 400 ml of dry, freshly distilled $CH_2Cl_2$. Work-up as described in the experiment above gave 18.7 g (0.42 mol of the "ideal" $(H_2SiNH)_n$, 75% yield) of a cloudy, viscous oil. The 60 MHz $^1H$ NMR spectrum showed two peaks in the SiH region: SiH$_A$, $\delta$4.70(m) and SiH$_B$, 4.32 ppm (s); SiH$_A$/SiH$_B$ = 8.2. A broad NH resonance was found at $\delta$1.00–1.70 ppm; (SiH$_A$+SiH$_B$):NH = 3.0. The IR spectrum showed (cm$^{-1}$): 3390s, 2170vs, 1195s, 1050–845br, 785sh. This oil was more viscous and cloudy than the oil obtained in the reaction carried out in ether solution. The $^1H$ NMR and infrared spectra of this sample also indicated that it was of the general type $(H_2SiNH)_n$, but of higher average molecular weight as evidenced by the higher ratio of internal to terminal SiH protons and the higher viscosity. A total of 57.1 g (97% as pure $NH_4Cl$) of $CH_2Cl_2$—insoluble white solid was formed in the ammonolysis reaction; only a small amount was insoluble in water.

Similar reactions were carried out between $H_2SiCl_2$ in toluene and in hexane. In the reaction performed in toluene, a 31% yield (as $H_2SiNH)_n$) of a cloudy, viscous oil (SiH$_A$:SiH$_B$ = 3.1; (SiH$_A$+SiH$_B$)/HN = 4.3) was obtained. The white precipitate formed in the ammonolysis reaction reacted exothermally with water and contained a considerable amount of water-insoluble material. The reaction carried out in hexane gave only hexane-insoluble solid from which nothing could be extracted with $CH_2Cl_2$. Evaporation of the hexane phase at reduced pressure left no high boiling products.

EXAMPLE III

Intermediate Thermal Treatment of the Ammonolysis Product Obtained in Diethyl Ether A tapered 50 ml three-necked, round-bottomed flask equipped with an argon inlet tube, a glass stopper and an outlet tube leading to a mercury bubbler was charged with 0.9224 g of I (dry box). The flask was placed in a 110° C. oil bath while a slow flow of argon was passed over the ammonolysis product. After 4.5 hr. the sample was still fluid and only slightly more cloudy. No weight-loss had occurred and no gas appeared to have been evolved. After 10 hr, at 110° C., the sample had hardened to a gel, with no loss in weight and no apparent production of gas. Another 10 hr of heating of 110° C. produced no further changes. In another experiment, 1.0546 g of I was heated at 160° C. under a slow flow of argon. After the first hour, white fumes were seen evolving and the sample hardened to a gel. After 4.5 hr, the sample had become solid. White fumes were observed above the sample and 7 mg (0.66% by weight) had been lost. After another 5.5 hr, at 160° C., the sample was rockhard and the edges had cracked; a weight loss of 0.0592 g (5.6% by weight) was measured. After 20 hr. total heating at 160° C., no further changes were observed.

The changes which occur at room temperature in I were monitored by NMR spectroscopy. Freshly prepared samples of I were placed in carefully washed and oven-dried glass bottles in the dry box and sealed with polyseal caps. One sample was left in the dry box at room temperature while the other was removed from the dry box and stored in a −5° C. refrigerator. After two days, the room temperature sample had become noticeably more viscous, although it was still liquid. No weight loss was observed. The −5° C. sample was unchanged in appearance after two days. An NMR study of the two samples revealed that the original $SiH_A:SiH_B$ ration of 5.82 had not changed in the refrigerated sample. However, in the room temperature sample, it was reduced (to 5.18). The $(SiH_A+SiH_B):NH$ ratio of 4.25 was unchanged in both samples after two days. After 4 days, the room temperature sample had become an insoluble gel; the −5° C. sample was unchanged. Acid- or based-washing the vials in which such samples were stored neither accelerated nor inhibited the changes which occur on room temperature storage of I.

EXAMPLE IV

Pyrolysis of the Ammonolysis Product Obtained in Ether: Formation of Silicon Nitride A small sample of I was placed in a fused silica boat which then was inserted into a quartz pyrolysis tube (all manipulations in the dry box). The sample first was heated to 200° C. in the hot tube furnace for 1 hr under a slow flow of the blanket gas, during which time a small amount of white fumes was evolved and the sample became a solid. The temperature then was increased slowly to 1150° C. When argon was the blanket gas, the sample became a hard, deep-red colored solid at 500° C. Continued pyrolysis at 1150° C. for 5 hrs produced a dark brown, crystalline solid which was identified as a mixture of $\alpha$-$Si_3N_4$, $\beta$-$Si_3N_4$, and elemental silicon on the basis of its X-ray powder diffraction pattern ($d_o$, Å): 4.34s($\alpha$), 3.30m($\beta$), 3.15s(Si), 2.89s($\beta$), 2.67m($\beta$), 2.60s($\alpha$), 2.55s($\alpha$), 2.50w($\beta$) and 2.32m($\alpha$).

A small sample of I was heated in similar manner under a slow flow of nitrogen at 1150° C. for 5 hrs. Again, a mixture of crystalline $\alpha$-$Si_3N_4$, $\beta$-$Si_3N_4$ and Si (in approximately the same proportions as under argon) was produced. However, when another sample of I was heated under nitrogen for 12 hrs, the only crystalline products were $\alpha$-$Si_3N_4$ and a very small amount of elemental Si (X-ray powder diffraction pattern). In this pyrolysis also, a bright red solid was observed when the temperature reached 500° C.

In a yield experiment, 0.4073 g of I (9.05 mmol as $(H_2SiNH)_n$) was heated carefully in the tube to solidify the oil. The sample then was heated under a slow flow of nitrogen at 1150° C. for 12 hrs. A brown crystalline solid, 0.3210 g, was produced. The X-ray powder pattern showed only $\alpha$-$Si_3N_4$ and a very small amount of Si to be present. This yield was calculated at 76%

Another sample of I was pyrolyzed under a slow flow of ammonia at 1150° C. for 12 hrs. The X-ray powder diffraction pattern of the solid product showed no crystalline products.

We claim:

1. A stable liquid, halide-free polymer of silicon, hydrogen and nitrogen prepared by reacting in the absence of oxygen and moisture a dihydrodihalosilane with ammonia in a solvent selected from the group consisting of an ether, a chloromethane and mixtures thereof to form the soluble liquid polymer and insoluble precipitated ammonium halide, separating the soluble liquid polymer from the insoluble ammonium halide in an oxygen and moisture-free atmosphere to obtain a soluble liquid polymer solution free of ammonium halide and subsequently recovering the polymer free of ammonium halide from the solvent.

2. The composition of claim 1 wherein the halosilane is dichlorosilane.

3. The composition of any one of claims 1 or 2 wherein the solvent is an aliphatic ether.

4. The composition of any one of claims 1 or 2 wherein the solvent is a chloromethane.

5. The process for preparing a three-dimensional article of a sintered silicon nitride which comprises introducing the liquid composition of claim 1 free of ammonium halide into a container of desired shape and pyrolyzing said composition at a temperature between about 500° C. and about 1200° C. an oxygen and moisture-free atmosphere, thereby to convert said polymer to sintered silicon nitride.

6. The process of claim 5 wherein said atmosphere is nitrogen.

* * * * *